US012676911B2

(12) United States Patent
Herrero

(10) Patent No.: US 12,676,911 B2
(45) Date of Patent: Jul. 7, 2026

(54) IOT MECHANISM FOR DEVICE TO APPLICATION COMMUNICATION IN PHYSICAL ACCESS CONTROL SYSTEMS

(71) Applicant: Tyco Fire & Security GmbH, Neuhausen am Rheinfall (CH)

(72) Inventor: Rolando Herrero, Amherst, NH (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

(21) Appl. No.: 18/458,575

(22) Filed: Aug. 30, 2023

(65) Prior Publication Data
US 2025/0080614 A1 Mar. 6, 2025

(51) Int. Cl.
| | |
|---|---|
| *H04L 67/141* | (2022.01) |
| *G16Y 10/75* | (2020.01) |
| *G16Y 40/35* | (2020.01) |
| *H04L 41/0686* | (2022.01) |

(52) U.S. Cl.
CPC ............ *H04L 67/141* (2013.01); *G16Y 10/75* (2020.01); *G16Y 40/35* (2020.01); *H04L 41/0686* (2013.01)

(58) Field of Classification Search
CPC ... H04L 67/141; H04L 41/0686; G16Y 10/75; G16Y 40/35
USPC .................................................. 709/204–206
See application file for complete search history.

(56) References Cited

U.S. PATENT DOCUMENTS

| | | | |
|---|---|---|---|
| 8,941,465 B2 | 1/2015 | Pineau et al. | |
| 8,966,259 B2 | 2/2015 | Bartley et al. | |

| | | | |
|---|---|---|---|
| 9,141,091 B2 | 9/2015 | Herscovitch et al. | |
| 9,444,792 B2 | 9/2016 | Katz et al. | |
| 9,520,008 B2 | 12/2016 | Frenette et al. | |
| 9,531,503 B2 | 12/2016 | Katz et al. | |
| 9,558,606 B2 | 1/2017 | Radicella et al. | |
| 9,614,816 B2 | 4/2017 | Herrero | |

(Continued)

FOREIGN PATENT DOCUMENTS

| | | |
|---|---|---|
| CN | 113593086 A | 11/2021 |
| EP | 1938504 B1 | 4/2020 |

(Continued)

OTHER PUBLICATIONS

European Search Report issued in corresponding European Application No. 24 19 6829 dated Oct. 15, 2024.

*Primary Examiner* — David R Lazaro
*Assistant Examiner* — Mariegeorges A Henry
(74) *Attorney, Agent, or Firm* — ArentFox Schiff LLP

(57) ABSTRACT

Example implementations include a method, apparatus, and computer-readable medium for configuring a device in a physical security system via an open architecture. The device establishes an application message layer session by exchanging certificates with a publish-and-subscribe broker and subscribing to a first topic from the application to the device. The device receives a configuration for the device from the application via the publish-and-subscribe broker through one or more command messages on the topic, wherein the one or more command messages carry a plurality of objects that are in clear text at the application message layer and are protected at a transport layer. The device transmits for each object, an event message that indicates a status of the object. The device maintains the application message layer session by periodically sending heartbeat event messages.

18 Claims, 8 Drawing Sheets

(56) References Cited

U.S. PATENT DOCUMENTS

| | | | |
|---|---|---|---|
| 9,628,445 B2 | 4/2017 | Antonakakis | |
| 9,652,911 B2 | 5/2017 | Fedronic et al. | |
| 9,722,999 B2 | 8/2017 | Babbidge et al. | |
| 9,858,781 B1 | 1/2018 | Campero et al. | |
| 9,866,384 B2 | 1/2018 | Herrero | |
| 9,998,299 B2 | 6/2018 | Herrero | |
| 10,015,097 B2 | 7/2018 | Herrero | |
| 10,148,615 B2 | 12/2018 | Herrero | |
| 10,536,848 B2 | 1/2020 | Warren | |
| 10,839,628 B2 | 11/2020 | Berg et al. | |
| 10,970,949 B2 | 4/2021 | Ouellet | |
| 11,075,906 B2 | 7/2021 | Neilan | |
| 11,127,235 B2 | 9/2021 | Sinha et al. | |
| 11,296,933 B1 | 4/2022 | Herrero | |
| 11,469,893 B2 | 10/2022 | Herrero et al. | |
| 11,477,181 B2 | 10/2022 | Sathe et al. | |
| 11,622,271 B2 | 4/2023 | Herrero | |
| 11,647,012 B2 | 5/2023 | Herrero | |
| 2006/0069702 A1* | 3/2006 | Moeller | G06F 9/542 |
| 2010/0066487 A1 | 3/2010 | Bell | |
| 2013/0086497 A1* | 4/2013 | Ambuhl | G05B 15/02 |
| | | | 715/762 |
| 2016/0127323 A1* | 5/2016 | Antonakakis | H04L 9/40 |
| | | | 726/3 |
| 2016/0316497 A1 | 10/2016 | Dyk et al. | |
| 2017/0359343 A1 | 12/2017 | Sterl et al. | |
| 2019/0173951 A1 | 6/2019 | Sumcad et al. | |
| 2020/0244664 A1 | 7/2020 | Pate et al. | |
| 2022/0214652 A1 | 7/2022 | Trikha et al. | |
| 2023/0012084 A1 | 1/2023 | Herrero | |

FOREIGN PATENT DOCUMENTS

| | | | | | |
|---|---|---|---|---|---|
| GB | 2538963 A | 12/2016 | | | |
| KR | 10-2021-0061801 A | 5/2021 | | | |
| KR | 10-2552200 B1 | 7/2023 | | | |
| TW | 202206925 A | * | 2/2022 | ........... | H04L 51/214 |
| WO | WO-2019208162 A1 | * | 10/2019 | ........... | B25J 13/085 |
| WO | 2022/145966 A1 | | 7/2022 | | |
| WO | WO-2023075443 A1 | * | 5/2023 | ........... | H04W 28/02 |
| WO | 2023/133380 A1 | | 7/2023 | | |

* cited by examiner

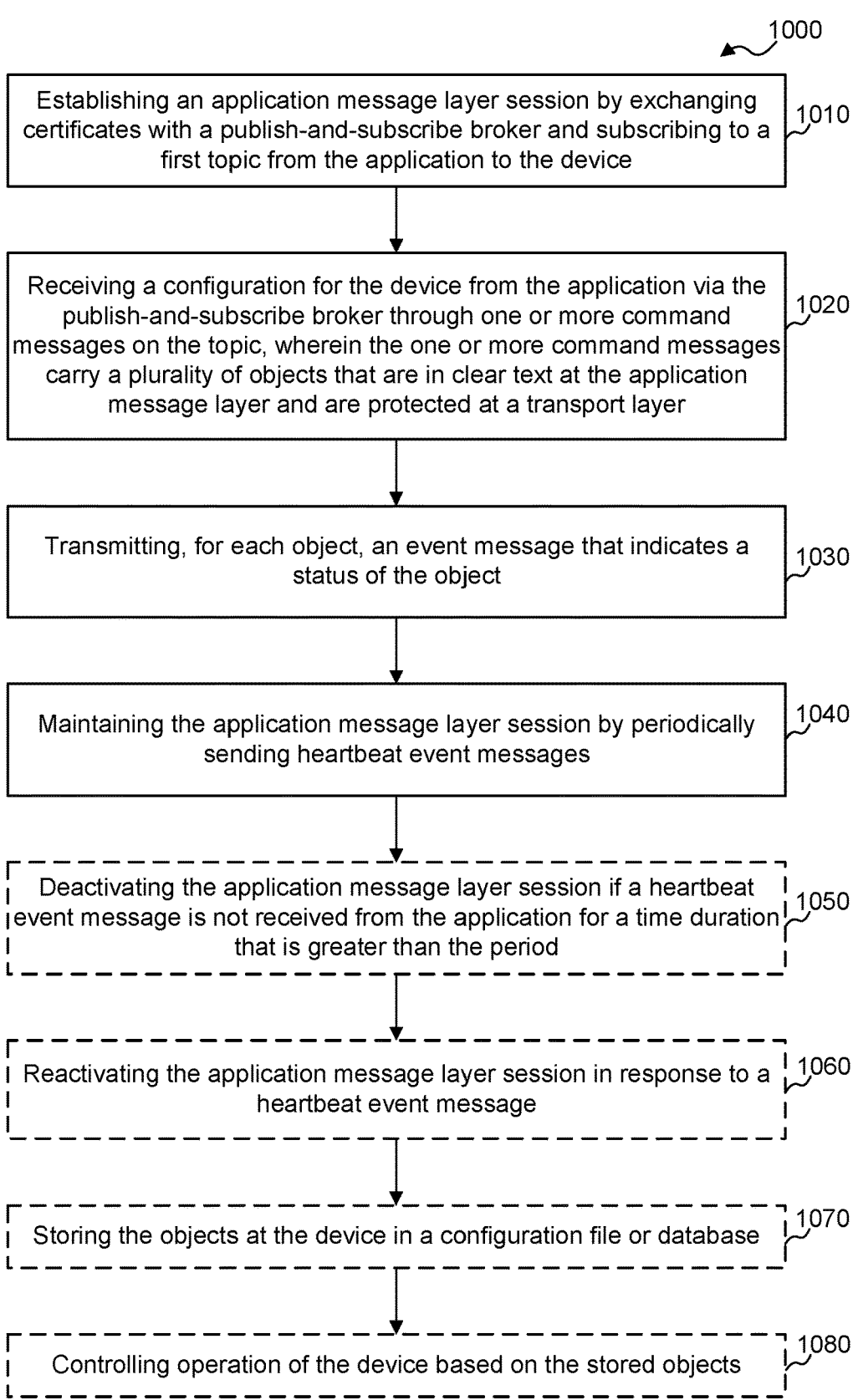

1000

1010
Establishing an application message layer session by exchanging certificates with a publish-and-subscribe broker and subscribing to a first topic from the application to the device 1020
Receiving a configuration for the device from the application via the publish-and-subscribe broker through one or more command messages on the topic, wherein the one or more command messages carry a plurality of objects that are in clear text at the application message layer and are protected at a transport layer 1030
Transmitting, for each object, an event message that indicates a status of the object 1040
Maintaining the application message layer session by periodically sending heartbeat event messages 1050
Deactivating the application message layer session if a heartbeat event message is not received from the application for a time duration that is greater than the period 1060
Reactivating the application message layer session in response to a heartbeat event message 1070
Storing the objects at the device in a configuration file or database 1080
Controlling operation of the device based on the stored objects

FIG. 10

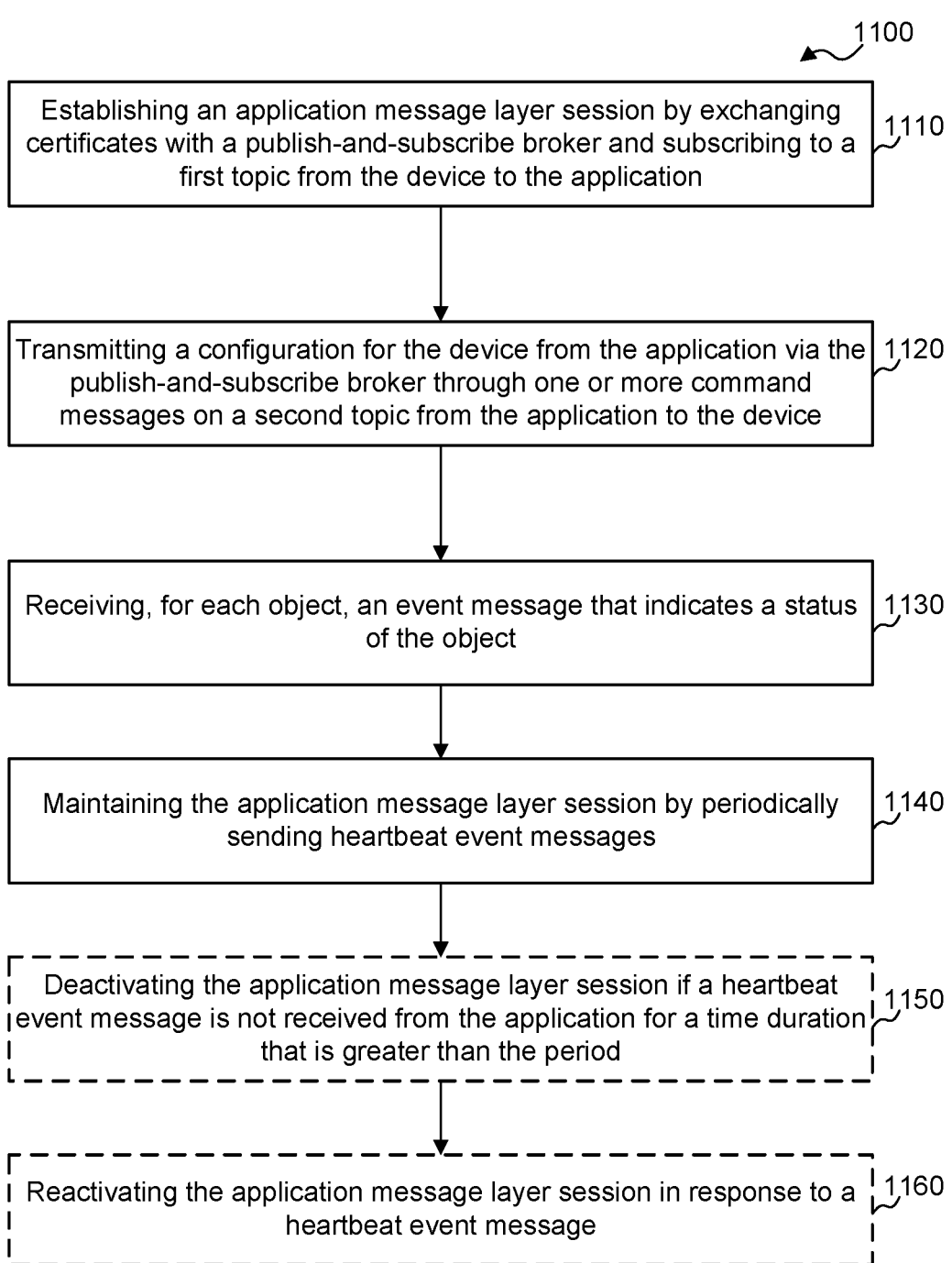

1100

Establishing an application message layer session by exchanging certificates with a publish-and-subscribe broker and subscribing to a first topic from the device to the application       1110

Transmitting a configuration for the device from the application via the publish-and-subscribe broker through one or more command messages on a second topic from the application to the device       1120

Receiving, for each object, an event message that indicates a status of the object       1130

Maintaining the application message layer session by periodically sending heartbeat event messages       1140

Deactivating the application message layer session if a heartbeat event message is not received from the application for a time duration that is greater than the period       1150

Reactivating the application message layer session in response to a heartbeat event message       1160

FIG. 11

IOT MECHANISM FOR DEVICE TO APPLICATION COMMUNICATION IN PHYSICAL ACCESS CONTROL SYSTEMS

FIELD

The present disclosure relates generally to an internet of things (IOT) mechanism for device to application communication in physical access control systems.

BACKGROUND

Physical access control systems include various devices that control access to an area, typically within a premises such as a building. For example, an access control system may include gates, doors, and identification devices such as card readers, radio frequency identification (RFID) readers, or keypads. In some cases, a physical access control system is integrated with a security system including cameras, sensors, or alarms.

Configuration of a physical access control system is often labor intensive. In addition to labor of installing the hardware devices, labor is often needed to update a configuration, even if there are no physical changes to the system. For example, a change in schedules or uses for an area may require a reconfiguration of the physical access control system. Thus, there is a need to improve configuration in physical access control systems.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects, the techniques described herein relate to a method of operation of a device, including: establishing an application message layer session by exchanging certificates with a publish-and-subscribe broker and subscribing to a first topic from the application to the device; receiving a configuration for the device from the application via the publish-and-subscribe broker through one or more command messages on the topic, wherein the one or more command messages carry a plurality of objects that are in clear text at the application message layer and are protected at a transport layer; transmitting, for each object, an event message that indicates a status of the object; and maintaining the application message layer session by periodically sending heartbeat event messages.

In some aspects, the techniques described herein relate to a method of configuring a device by an application, including: establishing an application message layer session by exchanging certificates with a publish-and-subscribe broker and subscribing to a first topic from the device to the application; transmitting a configuration for the device from the application via the publish-and-subscribe broker through one or more command messages on a second topic from the application to the device, wherein the one or more command messages carry a plurality of objects that are in clear text at the application message layer and are protected at a transport layer; receiving, for each object, an event message that indicates a status of the object; and maintaining the application message layer session by periodically sending heartbeat event messages.

In some aspects, the techniques described herein relate to a configurable security device, including: one or more memories storing computer executable instructions; and one or more processors coupled to the one or more memories and, individually or in combination, configured to cause the device to: establish an application message layer session by exchanging certificates with a publish-and-subscribe broker and subscribing to a topic from the application to the device; receive a configuration for the device from the application via the publish-and-subscribe broker through one or more command messages on the topic, wherein the one or more command messages carry a plurality of objects that are in clear text at the application message layer and are protected at a transport layer; transmit for each object, an event message that indicates a status of the object; and maintain the application message layer session by periodically sending heartbeat event messages.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 10 is a flowchart of an example method of a device for configuration from an application; and FIG. 11 is a flowchart of an example method of an application to control a device.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

A premises for building automation with physical security systems may include multiple devices that can be controlled. Often a control panel can be associated with multiple other devices such as card readers and doors. Conventionally, each device has a proprietary control system for configuration and operation. This closed architecture may limit options for integration with other devices and development of applications for physical security systems.

In an aspect, the present disclosure provides a communication mechanism that supports an Open Architecture. The communication mechanism includes several protocols that enable applications to interact with physical access control systems in the context of building automation. Because this architecture is open, the protocol specifications are open and available to end users. Accordingly, an application may be developed by a third party to interact with devices in the physical access control system, while still providing security.

Turning now to the figures, example aspects are depicted with reference to one or more components described herein, where components in dashed lines may be optional.

Figure 1:
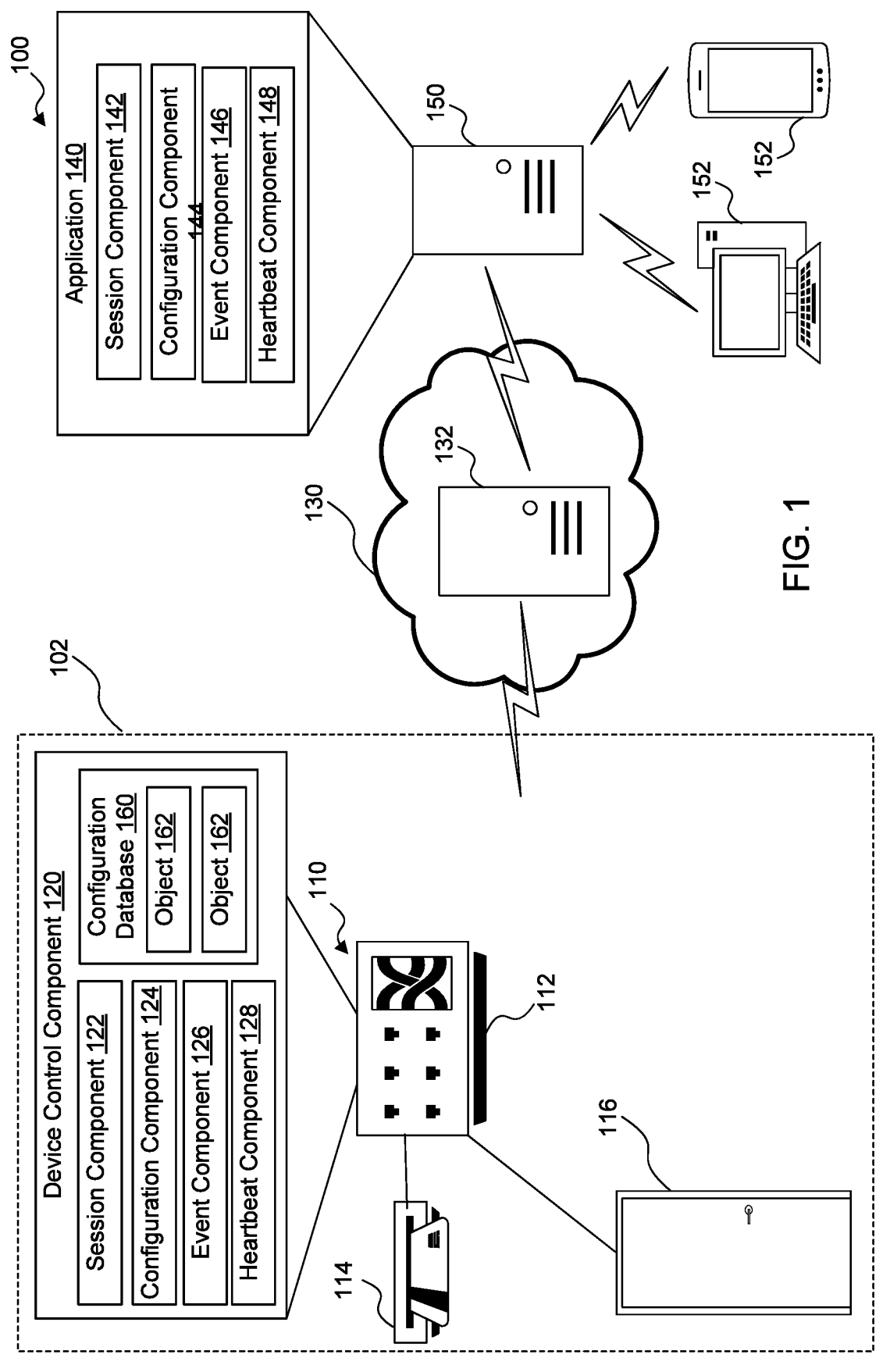
FIG. 1 is a schematic diagram of a physical access control environment for an application for device management, according to some aspects.

Referring to FIG. 1, in one non-limiting aspect, for example, a physical security environment 100 for a premises 102 includes devices 110 for physical security. The devices 110 may communicate with an application 140 via a network 130 including publish-and-subscribe broker 132. The application 140 and the devices 110 may establish application layer session to control configuration and operation of the devices 110.

A device 110 may include any device with a device control component 120 for controlling the device according to the mechanisms described herein. For example, a device 110 may include a control panel 112, a card reader 114, or a door 116. In some implementations, one device (e.g., control panel 112) may include the device control component 120 and control other components of the physical security environment via propriety protocols or direct electrical signals.

The application 140 may control the configuration and operation of the device 110 by configuring objects at the device 110. For example, the device configuration component 120 may include a configuration database 160 that stores objects 162. Each object 162 may include configuration information for the device 110. The device 110 is configured to operate according to the configuration database 160 and objects 162. For example, the control panel 112 may check a personnel object 162 to determine whether a person detected by the reader 114 is allowed to pass through the door 116. The control panel 112 may then control the door based on the result determined according to the configuration database 160. The application 140 may send commands to add, delete, modify, or retrieve the objects 162. Accordingly, the application 140 may flexibly control the configuration and operation of the devices 110.

The device control component 120 is configured to control operation of a device 110. The device control component 120 includes a session component 122 configured to establish an application message layer session by exchanging certificates with a publish-and-subscribe broker 132 and subscribing to a first topic from the application 140 to the device 110. The device control component 120 includes a configuration component 124 configured to receive a configuration for the device from the application via the publish-and-subscribe broker through one or more command messages on the topic. The one or more command messages carry a plurality of objects that are in clear text at the application message layer and are protected at a transport layer. The device control component 120 includes an event component 126 configured to transmit for each object, an event message that indicates a status of the object. The device control component 120 includes a heartbeat component 128 configured to maintain the application message layer session by periodically sending heartbeat event messages.

The application 140 is configured to configure one or more devices 110. The application 140 includes components corresponding to the components of the device control component 120. The application 140 includes a session component 142 configured to establish an application message layer session by exchanging certificates with a publish-and-subscribe broker and subscribing to a first topic from the device to the application. The application 140 includes a configuration component 144 configured to transmit a configuration for the device from the application via the publish-and-subscribe broker through one or more command messages on a second topic from the application to the device. The one or more command messages carry a plurality of objects that are in clear text at the application message layer and are protected at a transport layer. The application 140 includes an event component 146 configured to receive, for each object, an event message that indicates a status of the object. The application 140 includes a heartbeat component 148 configured to maintain the application message layer session by periodically sending heartbeat event messages.

The application 140 may be hosted on a computing device 150. The computing device 150 may be, for example, a server or generic computing resources in a datacenter of a cloud service. In some implementations, the computing device 150 may be provided by a same cloud service as the publish-and-subscribe broker 132. In some implementations, the application 140 may be accessed by user devices 152, which may include personal computers, laptop computers, tablets, mobile phones, etc. The application 140 may provide a user interface on the user devices 152.

Figure 2:
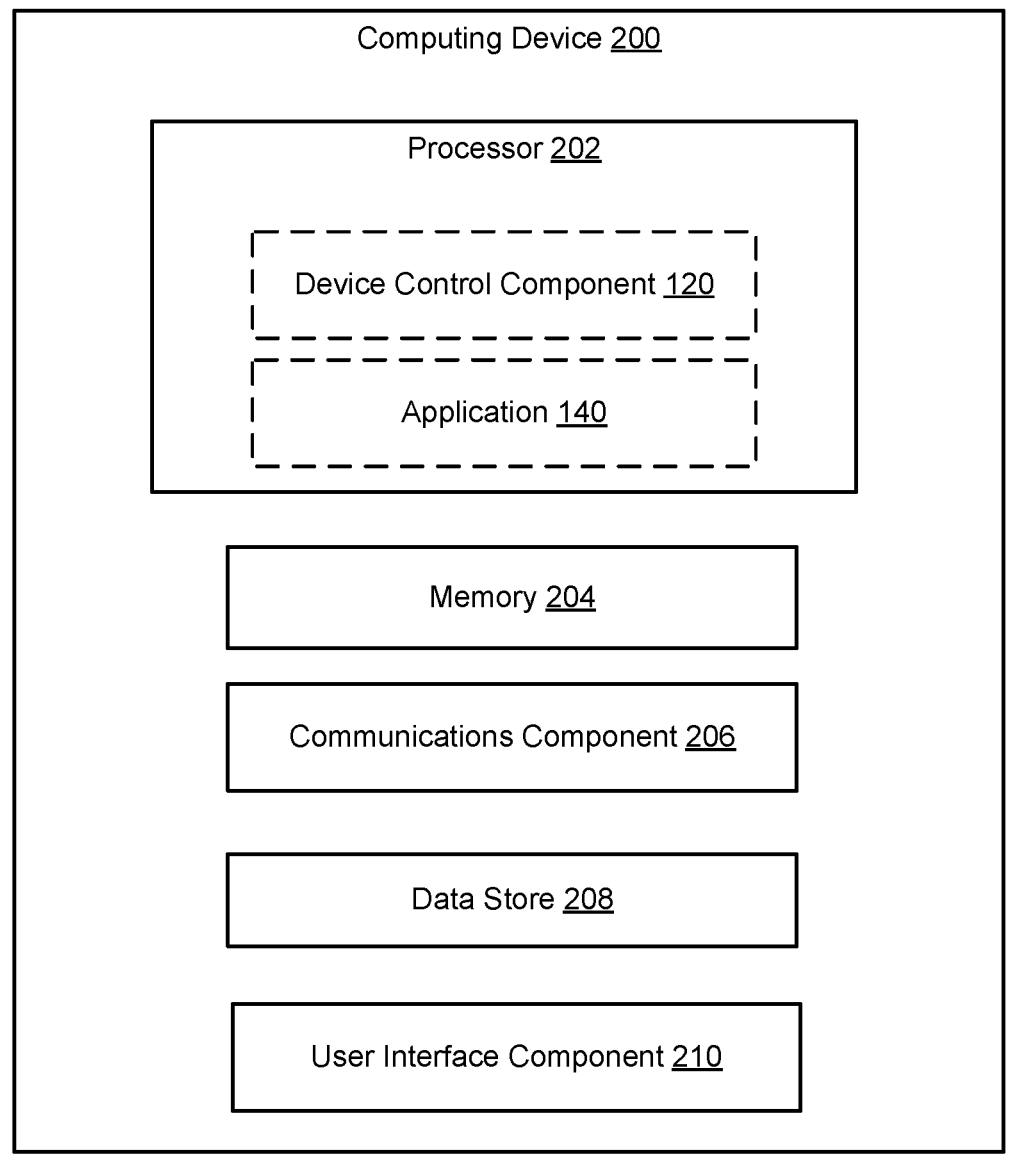
FIG. 2 is a block diagram of an example computing device which may implement all or a portion of any component or device in FIG. 1, according to some aspects.

FIG. 2 illustrates an example block diagram providing details of computing components in a computing device 200 that may implement all or a portion of one or more components in a control panel, a cloud system, a security/automation sensor or device, a user device (e.g., a smartphone, a tablet, a laptop computer, a desktop computer, etc.), a dedicated device, or any other component described above. For example, the computing device 200 may implement the device control component 120, the publish-and-subscribe broker 132, the application 140, the computing device 150 or a user device 152. The computing device 200 includes a processor 202 which may be configured to execute or implement software, hardware, and/or firmware modules that perform any functionality described above with reference to one or more components in a control panel, a cloud system, a security/automation sensor or device, a user device, a dedicated device, or any other component described above. For example, the processor 202 may be configured to execute a device management component 222 to provide device management functionality as described herein with reference to various aspects. For example, the processor 202 may be configured to execute software for the device control component 120 or the application 140. The software may be stored in the memory 204.

The processor 202 may be a micro-controller and/or may include a single or multiple set of processors or multi-core processors. Moreover, the processor 202 may be implemented as an integrated processing system and/or a distributed processing system. The computing device 200 may further include a memory 204, such as for storing local versions of applications being executed by the processor 202, related instructions, parameters, etc. The memory 204 may include a type of memory usable by a computer, such as random access memory (RAM), read only memory (ROM), tapes, flash drives, magnetic discs, optical discs, volatile memory, non-volatile memory (e.g., a non-transitory computer-readable medium storing instructions executable by the processor 202), and any combination thereof. Additionally, the processor 202 and the memory 204 may include and execute an operating system executing on the processor 202, one or more applications, display drivers, etc., and/or other components of the computing device 200.

Further, the computing device 200 may include a communications component 206 that provides for establishing and maintaining communications with one or more other devices, parties, entities, etc., utilizing hardware, software, and services. The communications component 206 may carry communications between components on the computing device 200, as well as between the computing device 200 and external devices, such as devices located across a communications network and/or devices serially or locally connected to the computing device 200. For example, the communications component 206 may include one or more buses, and may further include transmit chain components and receive chain components associated with a wireless or wired transmitter and receiver, respectively, operable for interfacing with external devices.

Additionally, the computing device 200 may include a data store 208, which can be any suitable combination of hardware and/or software, that provides for mass storage of information, databases, and programs. For example, the data store 208 may be or may include a data repository for applications and/or related parameters not currently being executed by the processor 202. In addition, the data store 208 may be a data repository for an operating system, application, display driver, etc., executing on the processor 202, and/or one or more other components of the computing device 200.

The computing device 200 may also include a user interface component 210 operable to receive inputs from a user of the computing device 200 and further operable to generate outputs for presentation to the user (e.g., via a display interface to a display device). The user interface component 210 may include one or more input devices, including but not limited to a keyboard, a number pad, a mouse, a touch-sensitive display, a navigation key, a function key, a microphone, a voice recognition component, or any other mechanism capable of receiving an input from a user, or any combination thereof. Further, the user interface component 210 may include one or more output devices, including but not limited to a display interface, a speaker, a haptic feedback mechanism, a printer, any other mechanism capable of presenting an output to a user, or any combination thereof.

Figure 3:
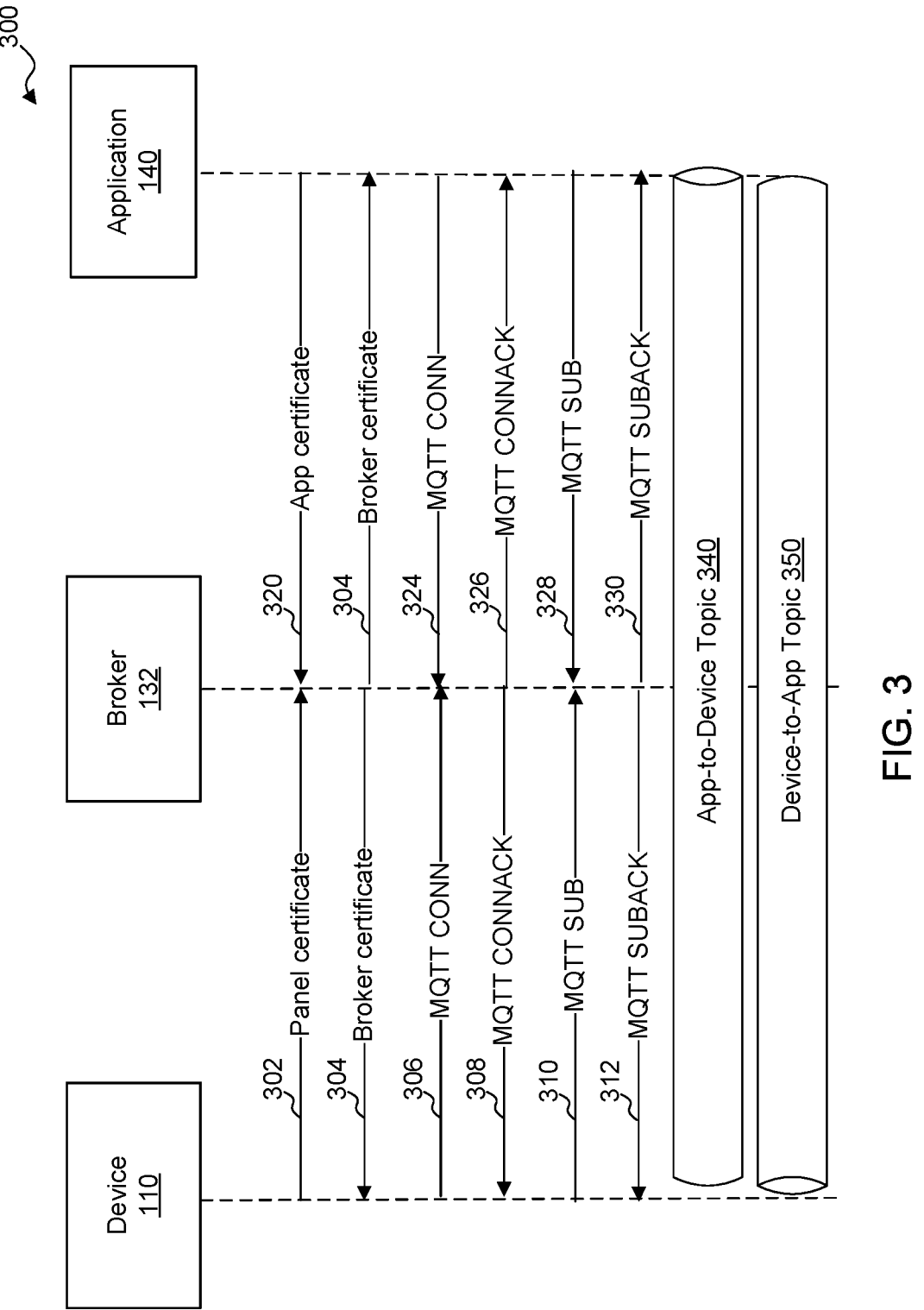
FIG. 3 is a message diagram illustrating example communications for establishing an application layer session between a device and an application via a publish-and-subscribe broker.

FIG. 3 is a message diagram 300 illustrating example communications for establishing an application layer session between a device 110 and an application 140 via a publish-and-subscribe broker 132.

The open architecture is agnostic of the physical, link and network layers but because the open architecture relies on a publish-and-subscribe protocol such as MQTT for session management, the open architecture utilizes transmission control protocol (TCP) transport. TCP transport, in turn, relies on transport layer security (TLS) for security. Although the security parameters are independent of both MQTT and the upper layers, in some implementations, the open architecture requires mandatory TLSv1.3 support configured with mutual authentication. The open architecture follows standard Public Key Infrastructure (PKI) mechanisms for certificate management.

The open architecture session management may be based on standard MQTT v3.1.1 functionality. MQTT is an Event Driven Architecture (EDA) protocol that relies on a broker that forwards messages back and forth between endpoints. Under EDA there are neither clients nor servers and the endpoints transmit and asynchronously receive messages. In the context of the open architecture, panels and applications are endpoints that rely on a broker or a network of brokers to forward the traffic. When compared to traditional Representational State Transfer (REST), the presence of a broker changes the topology of the network. Panels transmit application layer messages to an MQTT v3.1.1 broker that forwards the messages to the application. The application, in turn, sends messages to the broker and the broker forwards them to the panels. The broker has session layer visibility and does not decode the messages. The architecture supports access clusters that follow a traditional IoT topology where a cluster head talks to cluster members. The cluster head acts as a proxy that enables the interaction between the application and the members With the open architecture, the use of an MQTT v3.1.1 broker is sufficient to guarantee the exchange of messages. In order to support the command event paradigm, the open architecture relies on two MQTT topics per session. Each topic is associated with a traffic direction. In an implementation, the names of the topics follow a specified naming protocol. For example, the topic names may be [app]2 [panel] and [panel]2[app] for traffic from the application to the panel and from the panel to the application respectively where [app] is the application identifier (i.e., host) and [panel] is the panel identifier (i.e., iSTAR30012b).

In some implementations, the open architecture forces endpoints to be configured with MQTT QoS level 2 to guarantee ordered and lossless delivery of messages. In addition, end-to-end TLS support guarantees full trust between MQTT endpoints.

In FIG. 3, the device 110 may establish an application message layer session by transmitting a panel certificate 302. In response the broker 132 sends a broker certificate 304. The panel certificate 302 and broker certificate 304 may be authenticated via PKI. Exchange of the certificates establishes secure mutually authenticated TLS sessions against the broker. For implementations utilizing MQTT, the device 110 then transmits an MQTT CONN message 306, which the broker acknowledges with an MQTT CONNACK message 308. The device 110 then subscribes the App-to-Device topic 340 by transmitting an MQTT SUB message 310, which the broker 132 acknowledges with an MQTT SUBACK message 312. The device 110 may then receive messages on the App-to-Device topic 340.

The application 140 performs a similar procedure to establish an application message layer session. The application 140 transmits an app certificate 320, and the broker 132 responds with the broker certificate 304. Once again, PKI is used to authenticate the certificates. Exchange of the certificates establishes secure mutually authenticated TLS sessions against the broker. The application 140 then sends an MQTT CONN message 324 and receives the MQTT CONNACK 326. The application 140 then subscribes to the device-to-app topic 350 by transmitting the MQTT SUB message 328, which the broker 132 acknowledges with the MQTT SUBACK 330. The application may then receive messages on the device-to-app topic 350. In an implementation, because the topics 340, 350 utilize known naming conventions with a unique name specific to the device 110 and the application 140, the source of the message does not need additional signaling to initiate the topics 340, 350.

Figure 4:
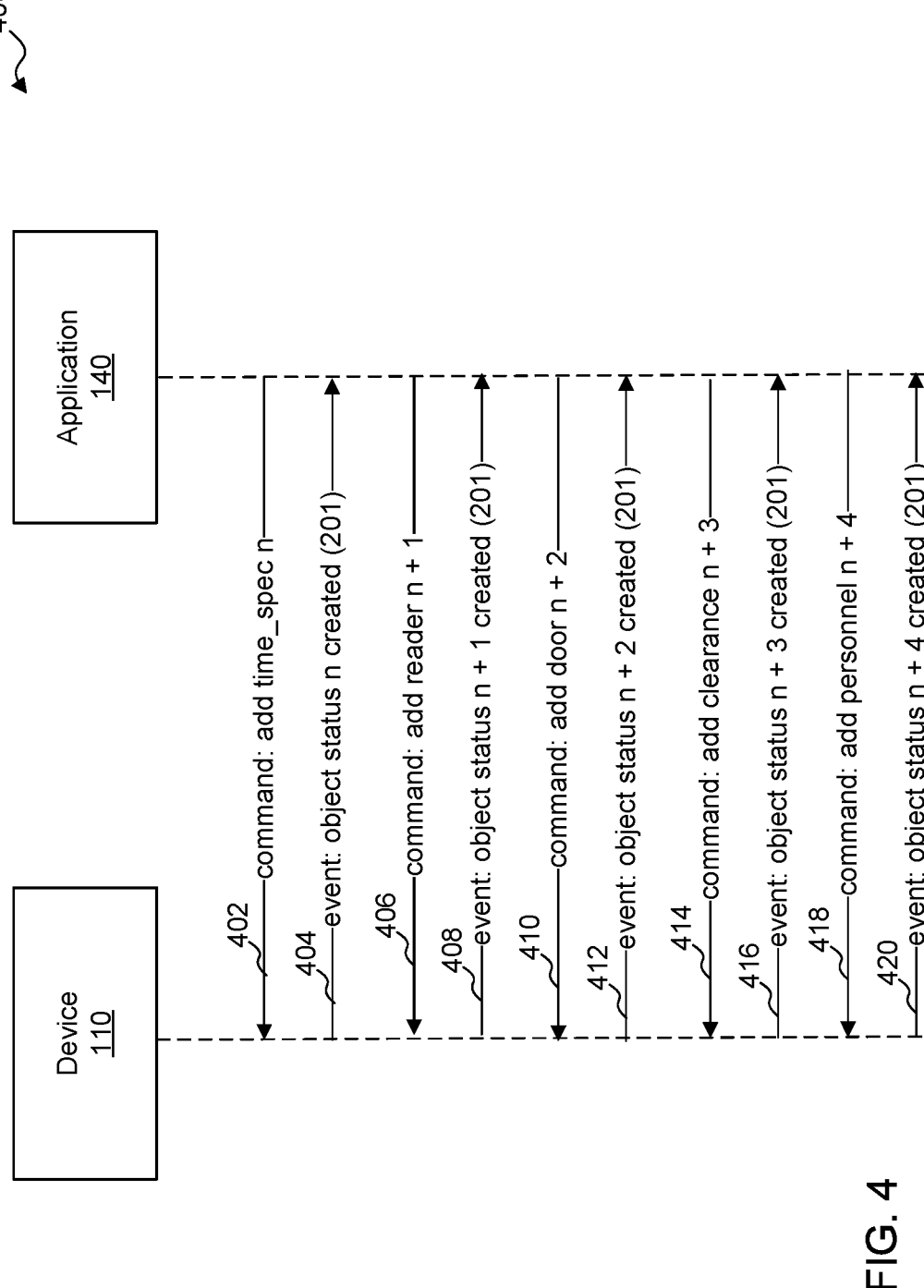
FIG. 4 is a message diagram illustrating example communications for configuring a device with multiple commands.

FIG. 4 is a message diagram 400 illustrating example communications for configuring a device 110 with multiple commands. In an aspect, messages may be commands or events. In some implementations, the messages are encoded following standard JavaScript object notation (JSON) data structures. The objects 162 (FIG. 1) support string and numerical types as well as arrays. In some implementations, the open architecture makes no modifications or changes to the way in which data is stored with JSON. Any standard JSON encoder/decoder can be used to prepare messages for transmission. Additionally, the objects are in clear text at the application message layer and are protected at a transport layer. Accordingly, a person with access to the messages at the device 110 or application 140 may read the messages. The JSON format of the objects allows for a human-readable form that improves ability to detect errors and/or debug a configuration.

In an aspect, a device 110 may be configured by adding objects 162 to the device 110. The device 110 may store the objects 162 at the device 110 (e.g., in configuration database 160) and operate the device 110 according to the configuration indicated by the objects 162.

In the example of FIG. 4, the application 140 may transmit multiple commands to configure a device 110, which may be a panel 112 connected to a card reader 114 and a door 116.

The application 140 transmits a command 402 to "add" a time spec with ID n. The panel 112 transmits a success event 404 once the object n is added. The success event includes the code (201). The application 140 transmits a command 406 to "add" a reader 114 with ID n+1. The panel 112 transmits a success event 408 once the object n+1 is added. The application 140 transmits a command 410 to "add" a door 116 with ID n+2. The panel 112 transmits a success event 412 once the object n+2 is added. The application 140 transmits a command 414 to "add" a clearance with ID n+3. For example, the clearance may define a clearance level for users detected by the card reader 114 that are allowed to pass through the door 116. The panel 112 transmits a success event 416 once the object n+3 is added. The application 140 transmits a command to "add" one personnel with ID n+4. For example, the personnel may define an individual user that is allowed to pass through the door 116. The panel 112 transmits a success event 420 once the object n+4 is added.

Figure 5:
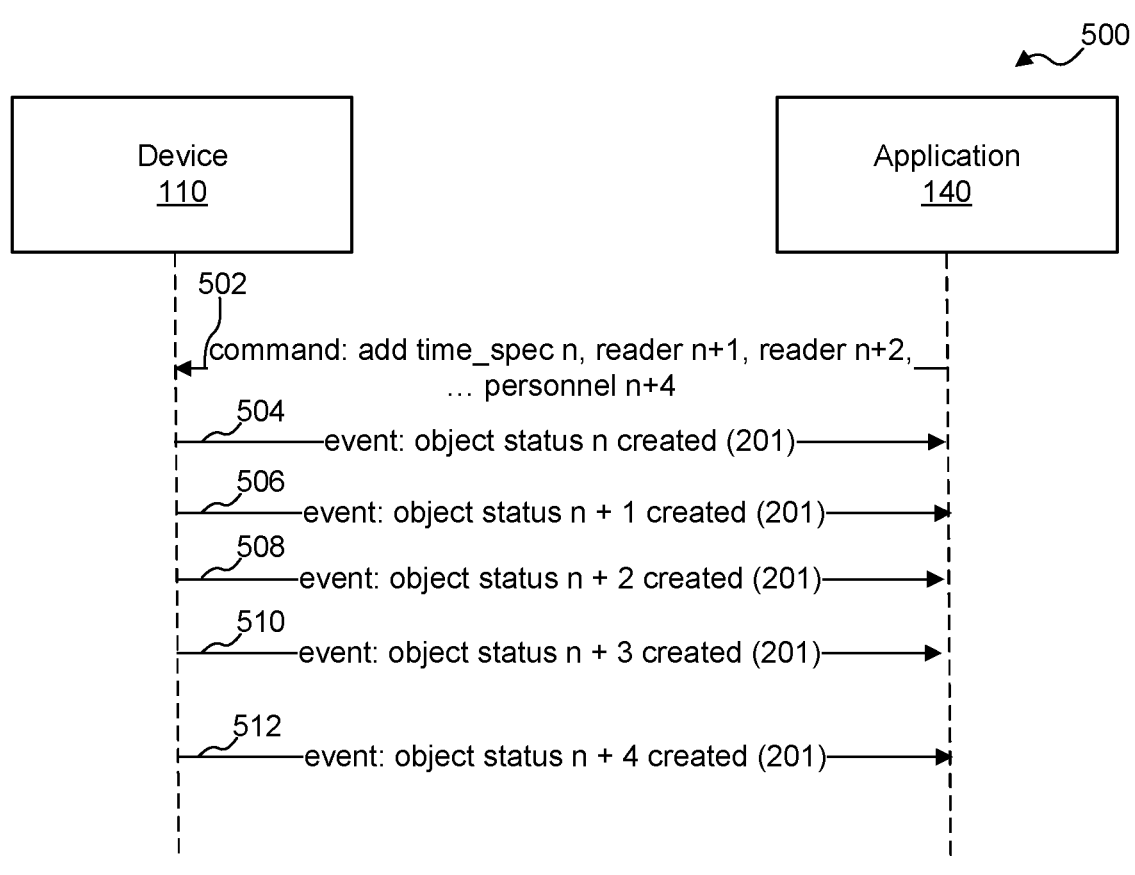
FIG. 5 is a message diagram illustrating example communications for configuring a device with a single command.

FIG. 5 is a message diagram 500 illustrating example communications for configuring a device with a single command. In the example of FIG. 5, the same panel 112, reader 114, and door 116 may be configured with a single command message including multiple objects. The device 110 may transmit an event for each object.

The application 140 transmits a command 502 to "add" a time spec with ID n, a reader 114 with ID n+1, a door 116 with ID n+2, a clearance with ID n+3 and one personnel with ID n+4. That is, the command 502 may include all of the objects included in the commands 402, 406, 410, 414, and 418. The device 110 (e.g., panel 112), however, transmits individual events for each object, for example, because not all objects may be added correctly generating different codes or objects may take different amounts of time to be added and configured at the device 110. Note that to efficiently store all objects into a database at the device 110, dependency check ups may be disabled for messages carrying more than 100 objects. That is, the device 110 may not check whether each reference in an object corresponds to a correctly configured object.

The panel 112 transmits a success event once the object n is added. The panel 112 transmits a success event 504 once the object n+1 is added. The panel 112 transmits a success event 506 once the object n+2 is added. The panel 112 transmits a success event 508 once the object n+3 is added. The panel 112 transmits a success event 510 once the object n+4 is added.

Figure 6:
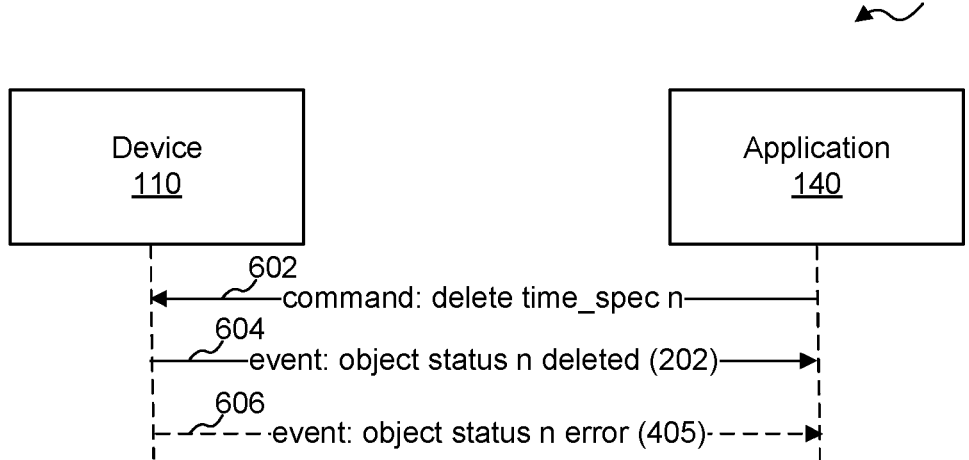
FIG. 6 is a message diagram illustrating example communications for deleting an object at a device.

FIG. 6 is a message diagram 600 illustrating example communications for deleting an object at a device 110. Deleting an object at the device 110 may remove that object from the configuration of the device 110. For example, in order to remove access of a person from a door 116, the application 140 may delete a personnel object associated with the door 116.

In the example of FIG. 6, the application 140 deletes a time specification object (i.e., a schedule). The application 140 transmits a command 602 to "delete" a time spec with ID n. The panel 112 transmits a success event 604 once the object n is deleted. Note the return code of the event is 202 to indicate that the object was deleted. As before, it is possible to include multiple objects for deletion in a single command. If deletion fails (for example, if the object does not exist), the panel 112 may transmit an event 606 indicating an error status (code 405) for the time spec object with ID n.

Figures 7, 8, 9:
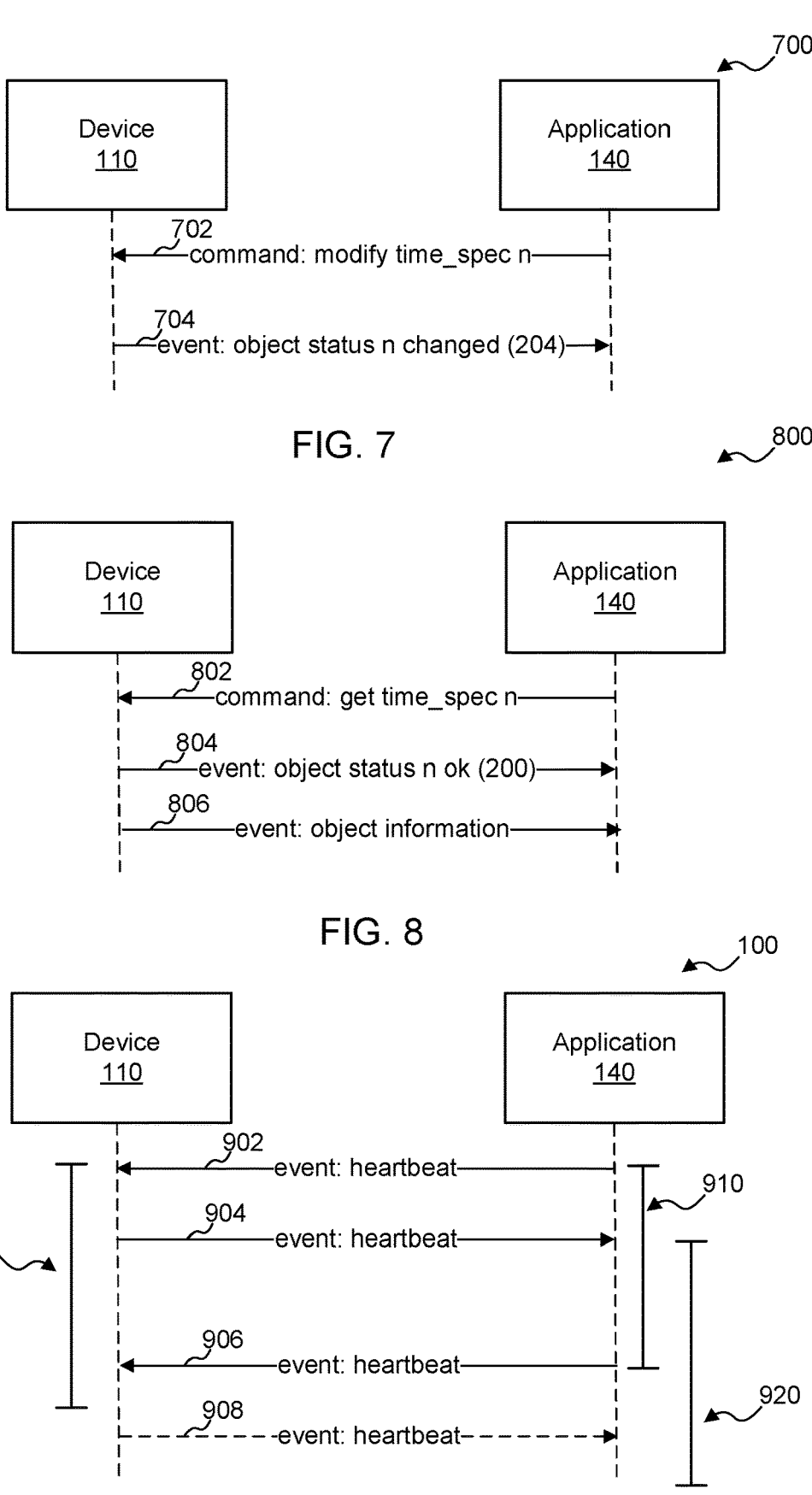
FIG. 7 is a message diagram illustrating example communications for modifying an object at a device.
FIG. 8 is a message diagram illustrating example communications for retrieving an object from a device.
FIG. 9 is a message diagram illustrating example communications for maintaining an application layer session between an application and a device.

FIG. 7 is a message diagram 700 illustrating example communications for modifying an object at a device 110. The application transmits a command 702 to "modify" a time spec with ID n. The panel 112 transmits a success event 704 once the object n is modified. Note the return code of the event 704 is 204 to indicate that the object was changed.

FIG. 8 is a message diagram 800 illustrating example communications for retrieving an object from a device 110. For example, the application 140 may retrieve information about an object such as a record generated by the device 110.

The application 140 transmits a command 802 to "get" a time spec with ID n. The panel 112 transmits a success event 804 for the object n once the command is processed. The panel 112 transmits an event 806 with the object configuration once it is retrieved.

Note the return code of the first success event 804 is 200 to indicate that the command was accepted. The actual configuration information is transmitted as a separate event 806. Separation between command return codes and actual object information supports IoT observation. That is, the application 140 maintains the status of object and the command before the information for the object is transmitted. As before it is possible to include multiple objects for retrieval in a single command, in which case the panel 112 may transmit a separate object status event 804 and object information event 806 for each object.

FIG. 9 is a message diagram illustrating example communications for maintaining an application layer session between an application and a device. Both the device 110 and the application 140 may transmit heartbeat event messages to indicate that the session is still active. In some implementations the device 110 and the application 140 are configured with a periodicity 910 for the heartbeat event messages. For example, the periodicity 910 may be 30 seconds. The device and the application 140 may also be configured with a delay time 920, which is longer than the periodicity 910, for example, 35 seconds. If a heartbeat event message is not received within the delay time 920 after an expected time based on the periodicity, a device or application 140 may refrain from sending additional messages until a heartbeat event message is received.

As illustrated, the application 140 transmits a heartbeat event message 902 every 30 seconds. The device 110 similarly transmits a heartbeat event message 904 every 30 seconds.

The application and panel expect heartbeat events from each far end every 30 seconds. The device 110 receives a second heartbeat event message 906 within the delay time 920 from the first heartbeat event message 902, so the device 110 keeps the session active and transmits a second heartbeat event message 908. If the second heartbeat event message 908 is not received at the application 140 within the delay time 920 from the heartbeat event message 904, the application 140 may enter a dormant state, where the application 140 will wait for another heartbeat event message before sending additional messages.

FIG. 10 a flowchart of an example method 1000 for receiving a configuration at a device 110. The device 110 may perform the method 1000 such as via execution of the device control component 120 by processor(s) 202 and/or memory 204. For example, the memory 204 may store computer-executable code and the processor 202 may execute the computer-executable code to cause the device 110 to perform the method 1000 when executed by the one or more processor(s) 202, individually or in combination. Further, the device 110 may be configured to perform the method 1000 in communication with the application 140 and the publish-and-subscribe broker 132, as described herein.

At block 1010, the method 1000 includes establishing an application message layer session by exchanging certificates with a publish-and-subscribe broker and subscribing to a first topic from the application to the device. For example, in an aspect, device 110, processor 202, and/or memory 204 may execute the device control component 120 and/or the session component 122 to establish an application message layer session by exchanging certificates (e.g., panel certificate 302 and broker certificate 304) with a publish-and-subscribe broker 132 and subscribing to a first topic 340 from the application to the device. Accordingly, the device 110, processor 202, and/or memory 204 executing the device control component 120 and/or the session component 122 may provide means for establishing an application message layer session by exchanging certificates with a publish-and-subscribe broker and subscribing to a first topic from the application to the device.

At block 1020, the method 1000 includes receiving a configuration for the device from the application via the publish-and-subscribe broker through one or more command messages on the topic. For example, in an aspect, device 110, processor 202, and/or memory 204 may execute the device control component 120 and/or the configuration component 124 to receive a configuration (e.g., command 402 or 502) for the device from the application 140 via the publish-and-subscribe broker 132 through one or more command messages (e.g., command 402 or 502) on the topic 340. The one or more command messages carry a plurality of objects that are in clear text at the application message layer and are protected at a transport layer. Accordingly, the device 110, processor 202, and/or memory 204 executing the device control component 120 and/or the configuration component 124 may provide means for receiving a configuration for the device from the application via the publish-and-subscribe broker through one or more command messages on the topic.

At block 1030, the method 1000 includes transmitting, for each object, an event message that indicates a status of the object. For example, in an aspect, device 110, processor 202, and/or memory 204 may execute the device control component 120 and/or the event component 126 to transmit, for each object, an event message (e.g., event 404 or 504) that indicates a status of the object. Accordingly, the device 110, processor 202, and/or memory 204 executing the device control component 120 and/or the event component 126 may provide means for transmitting, for each object, an event message that indicates a status of the object.

In an aspect, the blocks 1020 and/or 1030 may include any of the message exchanges described above with respect to FIGS. 4-8. For example, receiving the configuration may include receiving any of the messages transmitted by the application as illustrated in FIGS. 4-8. Similarly, transmitting an event message may include any of the event messages transmitted by the device 110 in FIGS. 4-8.

At block 1040, the method 1000 includes maintaining the application message layer session by periodically sending heartbeat event messages. For example, in an aspect, device 110, processor 202, and/or memory 204 may execute the device control component 120 and/or the heartbeat component 128 to maintain the application message layer session by periodically sending heartbeat event messages. Accordingly, the device 110, processor 202, and/or memory 204 executing the device control component 120 and/or the heartbeat component 128 may provide means for maintaining the application message layer session by periodically sending heartbeat event messages.

At block 1050, the method 1000 may optionally include deactivating the application message layer session if a heartbeat event message is not received from the application for a time duration that is greater than the period. For example, in an aspect, device 110, processor 202, and/or memory 204 may execute the device control component 120 and/or the heartbeat component 128 to deactivate the application message layer session if a heartbeat event message is not received from the application for a time duration that is greater than the period. Accordingly, the device 110, processor 202, and/or memory 204 executing the device control component 120 and/or the heartbeat component 128 may provide means for deactivating the application message layer session if a heartbeat event message is not received from the application for a time duration that is greater than the period.

At block 1060, the method 1000 may optionally include reactivating the application message layer session in response to a heartbeat event message. For example, in an aspect, device 110, processor 202, and/or memory 204 may execute the device control component 120 and/or the heartbeat component 128 to reactivate the application message layer session in response to a heartbeat event message. Accordingly, the device 110, processor 202, and/or memory 204 executing the device control component 120 and/or the heartbeat component 128 may provide means for reactivating the application message layer session in response to a heartbeat event message.

At block 1070, the method 1000 may optionally include storing the objects at the device in a configuration file or database. For example, in an aspect, device 110, processor 202, and/or memory 204 may execute the device control component 120 and/or the configuration component 124 to store the objects at the device in a configuration file or database. Accordingly, the device 110, processor 202, and/or memory 204 executing the device control component 120 and/or the configuration component 124 may provide means for storing the objects at the device in a configuration file or database.

At block 1080, the method 1000 may optionally include controlling operation of the device based on the stored objects. For example, in an aspect, device 110, processor 202, and/or memory 204 may execute the device control component 120 and/or the configuration component 124 to control operation of the device based on the stored objects. Accordingly, the device 110, processor 202, and/or memory 204 executing the device control component 120 and/or the configuration component 124 may provide means for controlling operation of the device based on the stored objects.

FIG. 11 a flowchart of an example method 1100 for configuring a device 110. The computing device 150 may perform the method 1100 such as via execution of the application 140 by processor(s) 202 and/or memory 204. For example, the memory 204 may store computer-executable code and the processor 202 may execute the computer-executable code to cause the computing device 150 to perform the method 1100 when executed by the one or more processor(s) 202, individually or in combination. Further, the application 140 may be configured to perform the method 1100 in communication with the device 110 and the publish-and-subscribe broker 132, as described herein.

At block 1110, the method 1100 includes establishing an application message layer session by exchanging certificates with a publish-and-subscribe broker and subscribing to a first topic from the device to the application. For example, in an aspect, application, processor 202, and/or memory 204 may execute the session component 142 to establish an application message layer session by exchanging certificates (e.g., application certificate 320 and broker certificate 304) with a publish-and-subscribe broker 132 and subscribing to a first topic 350 from the device to the application. Accordingly, the application 140, processor 202, and/or memory 204 executing the session component 142 may provide means for establishing an application message layer session by exchanging certificates with a publish-and-subscribe broker and subscribing to a first topic from the device to the application.

At block 1120, the method 1100 includes transmitting a configuration for the device from the application via the publish-and-subscribe broker through one or more command messages on a second topic from the application to the device. For example, in an aspect, application 140, processor 202, and/or memory 204 may execute the configuration component 144 to transmit a configuration for the device 110 from the application 140 via the publish-and-subscribe broker 132 through one or more command messages (e.g., commands 402 and 502) on a second topic 340 from the application 140 to the device 110. The one or more command messages carry a plurality of objects that are in clear text at the application message layer and are protected at a transport layer. Accordingly, the application 140, processor 202, and/or memory 204 executing the configuration component 144 may provide means for transmitting a configuration for the device from the application via the publish-and-subscribe broker through one or more command messages on a second topic from the application to the device.

At block 1130, the method 1100 includes receiving, for each object, an event message that indicates a status of the object. For example, in an aspect, the application 140, processor 202, and/or memory 204 may execute the event component 146 to receive, for each object, an event message (e.g., events 404 and 504) that indicates a status of the object. Accordingly, the application 140, processor 202, and/or memory 204 executing the device control component 120 and/or the event component 146 may provide means for receiving, for each object, an event message that indicates a status of the object.

In an aspect, the blocks 1120 and/or 1130 may include any of the message exchanges described above with respect to FIGS. 4-8. For example, transmitting the configuration may include transmitting any of the command messages transmitted by the application 140 as illustrated in FIGS. 4-8. Similarly, receiving an event message may include any of the event messages transmitted by the device 110 in FIGS. 4-8.

At block 1140, the method 1100 includes maintaining the application message layer session by periodically sending heartbeat event messages. For example, in an aspect, the application 140, processor 202, and/or memory 204 may execute the heartbeat component 148 to maintain the application message layer session by periodically sending heartbeat event messages. Accordingly, the application 140, processor 202, and/or memory 204 executing the heartbeat component 148 may provide means for maintaining the application message layer session by periodically sending heartbeat event messages.

At block 1150, the method 1100 may optionally include deactivating the application message layer session if a heartbeat event message is not received from the device for a time duration that is greater than the period. For example, in an aspect, application 140, processor 202, and/or memory 204 may execute the heartbeat component 148 to deactivate the application message layer session if a heartbeat event message is not received from the device 110 for a time duration that is greater than the period. Accordingly, the application 140, processor 202, and/or memory 204 executing the heartbeat component 148 may provide means for deactivating the application message layer session if a heartbeat event message is not received from the device for a time duration that is greater than the period.

At block 1160, the method 1100 may optionally include reactivating the application message layer session in response to a heartbeat event message. For example, in an aspect, the application 140, processor 202, and/or memory 204 may execute the heartbeat component 148 to reactivate the application message layer session in response to a heartbeat event message. Accordingly, the device 110, processor 202, and/or memory 204 executing the heartbeat component 148 may provide means for reactivating the application message layer session in response to a heartbeat event message.

Some further example aspects are provided below.

Clause 1. A method of operation of a device, comprising: establishing an application message layer session by exchanging certificates with a publish-and-subscribe broker and subscribing to a first topic from the application to the device; receiving a configuration for the device from the application via the publish-and-subscribe broker through one or more command messages on the topic, wherein the one or more command messages carry a plurality of objects that are in clear text at the application message layer and are protected at a transport layer; transmitting, for each object, an event message that indicates a status of the object; and maintaining the application message layer session by periodically sending heartbeat event messages.

Clause 2. The method of clause 1, wherein the application message layer session includes the first topic from the application to the device and a second topic from the device to the application.

Clause 3. The method of clause 1 or 2, further comprising: receiving a command message to delete an object; and transmitting an event message that indicates whether the object is deleted.

Clause 4. The method of any of clauses 1-3, further comprising: receiving a command message to modify an object; and transmitting an event message that indicates whether the object is modified.

Clause 5. The method of any of clauses 1-4, further comprising: receiving a command message to return an object; transmitting a first event message that acknowledges the command message; and transmitting a second event message including object information.

Clause 6. The method of any of clauses 1-5, further comprising: deactivating the application message layer session if a heartbeat event message is not received from the application for a time duration that is greater than the period.

Clause 7. The method of clause 6, further comprising reactivating the application message layer session in response to a heartbeat event message.

Clause 8. The method of any of clauses 1-7, further comprising: storing the objects at the device in a configuration file or database; and controlling operation of the device based on the stored objects.

Clause 9. A method of configuring a device by an application, comprising: establishing an application message layer session by exchanging certificates with a publish-and-subscribe broker and subscribing to a first topic from the device to the application; transmitting a configuration for the device from the application via the publish-and-subscribe broker through one or more command messages on a second topic from the application to the device, wherein the one or more command messages carry a plurality of objects that are in clear text at the application message layer and are protected at a transport layer; receiving, for each object, an event message that indicates a status of the object; and maintaining the application message layer session by periodically sending heartbeat event messages.

Clause 10. The method of clause 9, further comprising: transmitting a command message to delete an object; and receiving an event message that indicates whether the object is deleted.

Clause 11. The method of clause 9 or 10, further comprising: transmitting a command message to modify an object; and receiving an event message that indicates whether the object is modified.

Clause 12. The method of any of clauses 9-12, further comprising: transmitting a command message to return an object; receiving a first event message that acknowledges the command message; and receiving a second event message including object information.

Clause 13. The method of any of clauses 9-13, further comprising: deactivating the application message layer session if a heartbeat event message is not received from the device for a time duration that is greater than the period.

Clause 14. The method of clause 13, further comprising reactivating the application message layer session in response to a heartbeat event message.

Clause 15. A configurable security device, comprising: one or more memories storing computer executable instructions; and one or more processors coupled to the one or more memories and, individually or in combination, configured to cause the device to: establish an application message layer session by exchanging certificates with a publish-and-subscribe broker and subscribing to a topic from the application to the device; receive a configuration for the device from the application via the publish-and-subscribe broker through one or more command messages on the topic, wherein the one or more command messages carry a plurality of objects that are in clear text at the application message layer and are protected at a transport layer; transmit for each object, an event message that indicates a status of the object; and maintain the application message layer session by periodically sending heartbeat event messages.

Clause 16. The device of clause 15, wherein the application message layer session includes the topic from the application to the device and a second topic from the device to the application.

Clause 17. The device of clause 15 or 16, further comprising: an actuator, wherein the one or more processors, individually or in combination, are configured to: store the objects at the device in a configuration file or database on the one or more memories; and control operation of the actuator based on the stored objects.

Clause 18. The device of any of clauses 15-17, wherein the one or more processors, individually or in combination, are configured to: deactivate the application message layer session if a heartbeat event message is not received from the application for a time duration that is greater than the period.

Clause 19. The device of any of clause 18, wherein the one or more processors, individually or in combination, are configured to: reactivate the application message layer session in response to a heartbeat event message.

Clause 20. The device of any of clauses 15-19, wherein the one or more processors, individually or in combination, are configured to: receive a command message to return an object; transmit a first event message that acknowledges the command message; and transmit a second event message including object information.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operation of a device, comprising:
establishing an application message layer session by exchanging certificates with a publish-and-subscribe broker and subscribing to a first topic from the application to the device;
receiving a configuration for the device from the application via the publish-and-subscribe broker through one or more command messages on the topic, wherein the one or more command messages carry a plurality of objects that are in clear text at the application message layer and are protected at a transport layer;
storing the plurality of objects received in the configuration for the device at the device in a configuration file or database;
controlling operation of the device based on the stored plurality of objects;
transmitting, for each object, an event message that indicates a status of the object; and
maintaining the application message layer session by periodically sending heartbeat event messages.

2. The method of claim 1, wherein the application message layer session includes the first topic from the application to the device and a second topic from the device to the application.

3. The method of claim 1, further comprising:
receiving a command message to delete an object; and
transmitting an event message that indicates whether the object is deleted.

4. The method of claim 1, further comprising:
receiving a command message to modify an object; and
transmitting an event message that indicates whether the object is modified.

5. The method of claim 1, further comprising:
receiving a command message to return an object;
transmitting a first event message that acknowledges the command message; and
transmitting a second event message including object information.

6. The method of claim 1, further comprising:
deactivating the application message layer session if a heartbeat event message is not received from the application for a time duration that is greater than the period.

7. The method of claim 6, further comprising reactivating the application message layer session in response to a heartbeat event message.

8. A method of configuring a device by an application, comprising:
establishing an application message layer session by exchanging certificates with a publish-and-subscribe broker and subscribing to a first topic from the device to the application;
transmitting a configuration for the device from the application via the publish-and-subscribe broker through one or more command messages on a second topic from the application to the device, wherein the one or more command messages carry a plurality of objects that are in clear text at the application message layer and are protected at a transport layer;
receiving, for each object, an event message that indicates a status of the object, wherein the event message for each object indicates that the device has stored the object received in the configuration for the device at the device in a configuration file or database and that the device is controlling operation of the device based on the stored object; and
maintaining the application message layer session by periodically sending heartbeat event messages.

9. The method of claim 8, further comprising:
transmitting a command message to delete an object; and
receiving an event message that indicates whether the object is deleted.

10. The method of claim 8, further comprising:
transmitting a command message to modify an object; and
receiving an event message that indicates whether the object is modified.

11. The method of claim 8, further comprising:
transmitting a command message to return an object;
receiving a first event message that acknowledges the command message; and
receiving a second event message including object information.

12. The method of claim 8, further comprising:
deactivating the application message layer session if a heartbeat event message is not received from the device for a time duration that is greater than the period.

13. The method of claim 12, further comprising reactivating the application message layer session in response to a heartbeat event message.

14. A configurable security device, comprising:
an actuator;
one or more memories storing computer executable instructions; and
one or more processors coupled to the one or more memories and, individually or in combination, configured to cause the device to:
establish an application message layer session by exchanging certificates with a publish-and-subscribe broker and subscribing to a topic from the application to the device;
receive a configuration for the device from the application via the publish-and-subscribe broker through one or more command messages on the topic, wherein the one or more command messages carry a plurality of objects that are in clear text at the application message layer and are protected at a transport layer;
store the plurality of objects received in the configuration for the device at the device in a configuration file or database;
control operation of the actuator based on the stored plurality of objects;
transmit for each object, an event message that indicates a status of the object; and
maintain the application message layer session by periodically sending heartbeat event messages.

15. The device of claim 14, wherein the application message layer session includes the topic from the application to the device and a second topic from the device to the application.

16. The device of claim 14, wherein the one or more processors, individually or in combination, are configured to:

deactivate the application message layer session if a heartbeat event message is not received from the application for a time duration that is greater than the period.

17. The device of claim 16, wherein the one or more processors, individually or in combination, are configured to:

reactivate the application message layer session in response to a heartbeat event message.

18. The device of claim 14, wherein the one or more processors, individually or in combination, are configured to:

receive a command message to return an object;

transmit a first event message that acknowledges the command message; and transmit a second event message including object information.

\* \* \* \* \*